United States Patent
Kubota et al.

(10) Patent No.: US 9,019,883 B2
(45) Date of Patent: Apr. 28, 2015

(54) TTI ADAPTATION IN E-DCH

(75) Inventors: Keiichi Kubota, Weybridge (GB); Brian Martin, Farnham (GB); Tao Chen, Espoo (FI)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/008,443

(22) PCT Filed: Mar. 30, 2012

(86) PCT No.: PCT/IB2012/051559
§ 371 (c)(1),
(2), (4) Date: Sep. 27, 2013

(87) PCT Pub. No.: WO2012/131637
PCT Pub. Date: Oct. 4, 2012

(65) Prior Publication Data
US 2014/0016595 A1    Jan. 16, 2014

Related U.S. Application Data

(60) Provisional application No. 61/470,689, filed on Apr. 1, 2011.

(51) Int. Cl.
| | | |
|---|---|---|
| G08C 17/00 | (2006.01) | |
| H04W 72/14 | (2009.01) | |
| H04W 48/10 | (2009.01) | |
| H04W 4/00 | (2009.01) | |
| H04L 12/28 | (2006.01) | |

(52) U.S. Cl.
CPC .............. *H04W 72/14* (2013.01); *H04W 48/10* (2013.01); *Y02B 60/50* (2013.01)

(58) Field of Classification Search
CPC ... H04W 72/02; H04W 72/04; H04W 72/042; H04W 72/0446; H04W 72/0453; H04W 72/14; H04W 72/1278; H04W 72/1289; H04W 74/006; H04W 74/002; H04W 36/0072; H04W 40/04
USPC .......................... 370/311, 328–338, 431–443
See application file for complete search history.

(56) References Cited

U.S. PATENT DOCUMENTS

| | | | |
|---|---|---|---|
| 2009/0109912 A1* | 4/2009 | DiGirolamo et al. | 370/329 |
| 2009/0181710 A1 | 7/2009 | Pani et al. | |
| 2009/0185540 A1* | 7/2009 | Pelletier et al. | 370/336 |
| 2009/0196230 A1* | 8/2009 | Kim et al. | 370/328 |
| 2010/0220623 A1 | 9/2010 | Cave et al. | |
| 2010/0226248 A1* | 9/2010 | Grilli | 370/230 |
| 2011/0128926 A1* | 6/2011 | Nama et al. | 370/329 |
| 2011/0274040 A1* | 11/2011 | Pani et al. | 370/328 |

FOREIGN PATENT DOCUMENTS

| | | |
|---|---|---|
| WO | 2007025160 | 3/2007 |
| WO | 2008131262 | 10/2008 |
| WO | 2009132169 | 10/2009 |
| WO | 2012138756 | 11/2012 |

* cited by examiner

*Primary Examiner* — Xavier Szewai Wong
(74) *Attorney, Agent, or Firm* — Oblon, McClelland, Maier & Neustadt, L.L.P.

(57) ABSTRACT

An apparatus, comprising at least one processor configured to dynamically change a timing parameter, such as a Transmission Timing Interval for an E-DCH resource for a second apparatus in a cell.

15 Claims, 5 Drawing Sheets

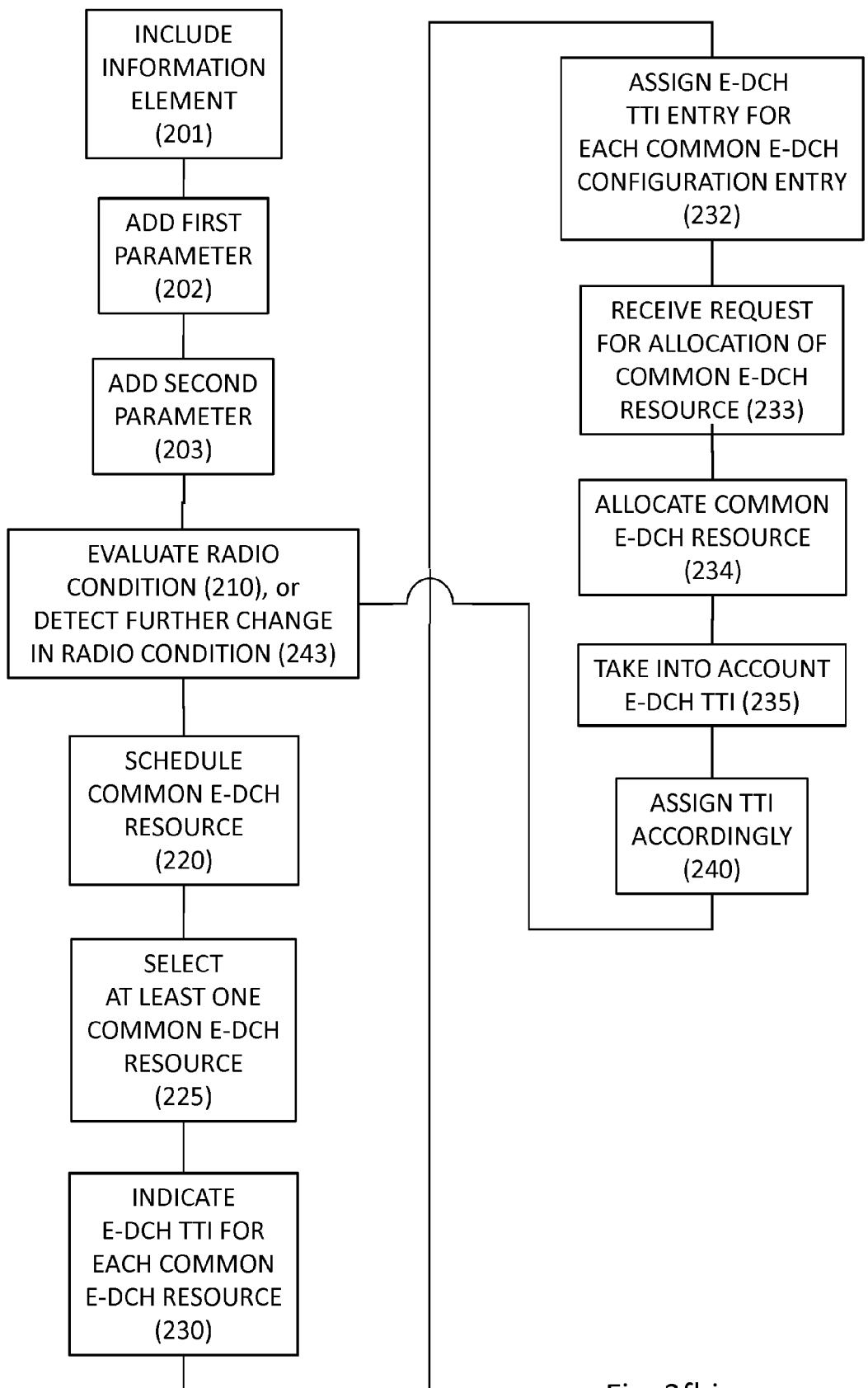
Fig. 2fbis

TTI ADAPTATION IN E-DCH

FIELD

This application relates to mobile communications systems, methods and apparatuses and in particular to switching the Transmission Time Interval.

BACKGROUND

As part of the ongoing evolution of wireless communications systems, the enhanced dedicated channel (E-DCH) in CELL_FACH state feature was introduced into wireless standard specifications, such as the third generation partnership project (3GPP) Release 8 specifications. Wireless transmit/receive units (WTRUs) operating in a CELL_FACH or IDLE mode may use a contention based E-DCH channel for uplink (UL) transmission rather than a traditional random access channel (RACH). The contention-based E-DCH channel allows for WTRUs to transfer signaling and data at significantly higher data rates and for longer durations, which reduces transfer and state transition delays with an aim to provide a user experience that is closer to "always-on connectivity."

Support for multiple transmission time interval (TTI) settings, (e.g., 2 ms and 10 ms), are allowed for the E-DCH in the CELL_FACH state. A single TTI setting, which may be determined and broadcast by the network, for example the universal mobile telecommunications system (UMTS) terrestrial radio access network (UT-RAN), may be used by all WTRUs accessing the E-DCH in the CELL_FACH state within a particular cell. While a smaller TTI, such as the 2 ms TTI, may be more advantageous from scheduling and latency standpoints, a larger TTI, such as the 10 ms TTI, may allow for a larger coverage area. Accordingly, the 10 ms TTI setting is often used throughout larger cells to allow for WTRUs, including those located near the cell edge, to reliably transfer signaling and data to the network.

Although the 10 ms TTI setting is used in some cases to ensure service reliability throughout the cell, it may desirable to take advantage of the fast scheduling and lower latency benefits of the 2 ms TTI. A number of methods to extend the coverage provided by the 2 ms TTI for E-DCH transmission in CELL_FACH have been proposed, such as TTI bundling. The application of TTI bundling for UL transmission using the E-DCH in CELL_FACH state may be used to improve the coverage with a smaller TTI, such as 2 ms TTI. However, a number of issues may need to be addressed. For example, it may need to be determined whether or not to apply TTI bundling. In addition, the automatic retransmission of the TTI bundling uses a lot of power perhaps unnecessarily which lowers the standby time and operating time of the User Equipment.

A method and an apparatus and a software product are thus needed to allow for more energy conservative use of the E-DCH channel.

SUMMARY

According to an aspect, an apparatus is disclosed being a network apparatus for a wireless network, the network apparatus being configured to communicate with wireless mobile terminals and to control communication of the wireless mobile terminals, and the network apparatus comprising at least one controller configured to dynamically change a timing parameter for a wireless mobile terminal in a cell by including an information element in a System Information Block, wherein the information element indicating what Absolute Grant Channel configuration parameters are to be used; detecting and evaluating a radio condition for a wireless mobile terminal; assigning the timing parameter accordingly and including a first parameter indicating which Absolute Grant Channel to be used for a corresponding communication channel resource and including a second parameter indicating the timing parameter for each entry in a corresponding channel configuration list.

In one embodiment the controller is further configured to allocate a first common E-DCH resource having a first AGCH with a timing parameter indicating 10 ms to a first wireless terminal and to allocate a second common E-DCH resource having a second AGCH with a timing parameter indicating 2 ms to a second wireless terminal.

According to another aspect, an apparatus is disclosed, comprising at least one controller configured to dynamically change a timing parameter for a second apparatus in a cell.

Such an apparatus has the benefit of being able to assign a timing parameter that has the needed advantages for a specific entity or apparatus in a cell thereby saving power and assuring an optimum performance.

In one embodiment the controller is further configured to include an information element in a System Information Block, wherein the information element indicating an Absolute Grant Channel. In one embodiment the controller is further configured to retrieve an AGCH index from the system information block and this AGCH index is indicative of which AGCH is to be used for an uplink channel. In one embodiment the uplink channel is an E-DCH resource.

In one embodiment the controller being further configured to detect a radio condition for a second apparatus and to assign a timing parameter accordingly and to include a first parameter indicating which Absolute Grant Channel to be used for a corresponding uplink channel and to include a second parameter indicating the timing parameter for each entry in a corresponding uplink channel configuration list.

In one embodiment the timing parameter is a Transmission Time Interval, TTI.

In one embodiment the uplink channel is an Enhanced Dedicated CHannel, E-DCH.

In one embodiment the first parameter is an AGCH selector index and wherein said second parameter is E-DCH Transmission Time Interval (TTI) and said corresponding uplink channel configuration list is a common E-DCH resource configuration list.

In one embodiment, the apparatus is a base station.

In one embodiment, the apparatus is a chipset. In one embodiment the chipset is comprised in a base station.

According to a further aspect, a method is disclosed comprising dynamically changing a timing parameter for a second apparatus in a cell.

According to a further aspect, a method is disclosed for a network apparatus for a wireless network, the network apparatus being configured to communicate with wireless mobile terminals and to control communication of the wireless mobile terminals, said method comprising dynamically changing a timing parameter for a wireless mobile terminal in a cell by including an information element in a System Information Block, wherein the information element indicating what Absolute Grant Channel configuration parameters are to be used; detecting and evaluating a radio condition for a wireless mobile terminal; assigning the timing parameter accordingly and including a first parameter indicating which Absolute Grant Channel to be used for a corresponding communication channel resource and including a second parameter indicating the timing parameter for each entry in a corresponding channel configuration list.

In one embodiment the method further comprises allocating a first common E-DCH resource having a first AGCH with a timing parameter indicating 10 ms to a first wireless terminal and allocating a second common E-DCH resource having a second AGCH with a timing parameter indicating 2 ms to a second wireless terminal.

According to a further aspect, a mobile communication system is disclosed comprising a base station and/or an apparatus according to above.

According to a further aspect, a computer program is disclosed for a network apparatus for a wireless network, the network apparatus being configured to communicate with wireless mobile terminals and to control communication of the wireless mobile terminals, said computer program comprising code adapted to cause the following when executed on a data-processing system: dynamically changing a timing parameter for a wireless mobile terminal in a cell by including an information element in a System Information Block, wherein the information element indicating what Absolute Grant Channel configuration parameters are to be used; detecting and evaluating a radio condition for a wireless mobile terminal; assigning the timing parameter accordingly and including a first parameter indicating which Absolute Grant Channel to be used for a corresponding communication channel resource and including a second parameter indicating the timing parameter for each entry in a corresponding channel configuration list.

In one embodiment the computer program further comprises code for allocating a first common E-DCH resource having a first AGCH with a timing parameter indicating 10 ms to a first wireless terminal and allocating a second common E-DCH resource having a second AGCH with a timing parameter indicating 2 ms to a second wireless terminal.

In one embodiment, the computer program is stored on a computer readable medium. The computer readable medium may be, but is not limited to, a removable memory card, a removable memory module, a magnetic disk, an optical disk, a holographic memory or a magnetic tape. A removable memory module may be, for example, a USB memory stick, a PCMCIA card or a smart memory card.

The embodiments described hereinbefore may be used in any combination with each other. Several of the embodiments may be combined together to form a further embodiment. A method, a system, an apparatus, a computer program or a computer program product to which the invention is related may comprise at least one of the embodiments described hereinbefore.

The benefits of the teachings herein are related to reducing power consumption of a system.

A further benefit is that the latency of a system is reduced as the timing parameters, the TTI, can be changed without any changes to the Broadcast Control CHannel, BCCH.

An even further benefit is that backward capability is achieved even though changes are made to some protocols, as the network can handle legacy Enhanced Uplink in CELL_FACH state and idle mode capable mobile stations or UEs by allocating a common E-DCH resource that is configured by an RRC (Radio Resource Control) signaling to those UEs.

BRIEF DESCRIPTION OF THE DRAWINGS

The accompanying drawings, which are included to provide a further understanding and constitute a part of this specification, illustrate embodiments and together with the description help to explain the principles. In the drawings:

FIG. 2fbis is a flowchart illustrating a method according to embodiments discussed herein.

DETAILED DESCRIPTION OF THE EMBODIMENTS

Reference will now be made in detail to the embodiments of the present invention, examples of which are illustrated in the accompanying drawings.

When referred to hereafter, the terminology "wireless transmit/receive unit (WTRU)" includes but is not limited to a user equipment (UE), a processor or a chipset, a mobile station, a fixed or mobile subscriber unit, a pager, a cellular telephone, a personal digital assistant (PDA), a computer, a data card, a USB dongle, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1A:
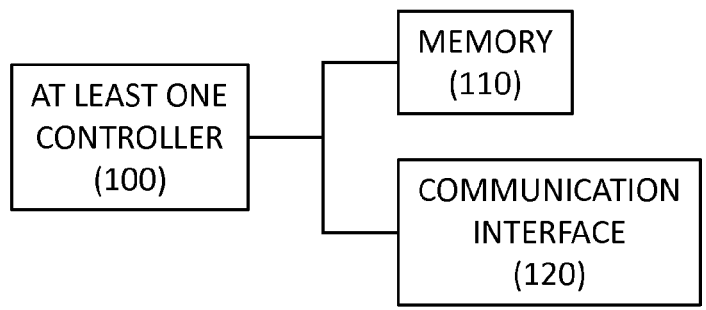
FIG. 1a is a block diagram illustrating an apparatus according to embodiments discussed herein.

FIG. 1a is a block diagram illustrating an apparatus according to an embodiment. The apparatus comprises at least one controller 100, such as a processor, a memory 110 and a communication interface 120. In one embodiment the apparatus is a computer chip. In the memory 110 computer instructions are stored which are adapted to be executed on the processor 110. The communication interface 120 is adapted to receive and send information to and from the processor 100. In one embodiment the computer chip or chipset is comprised in a base station.

Figure 1B:
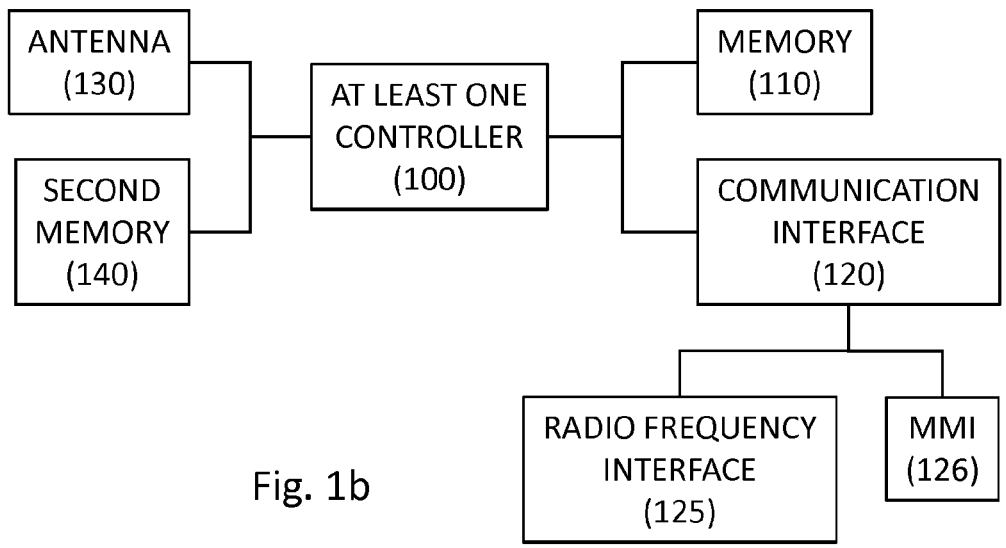
FIG. 1b is a block diagram illustrating an apparatus according to embodiments discussed herein.

FIG. 1b is a block diagram illustrating an apparatus according to an embodiment. In one embodiment the apparatus is a WTRU or a mobile station. The apparatus comprises at least one controller 100, such as a processor, a memory 110 and a communication interface 120. In the memory 110 computer instructions are stored which are adapted to be executed on the processor 100. The communication interface 120 is adapted to receive and send information to and from the processor 100. The communication interface 120 further comprises a radio frequency interface 125 for communicating between apparatuses and a man-machine interface (MMI) 126 for communicating between the apparatus and a user. In one embodiment the MMI 126 is optional. In one embodiment the MMI 126 is provided for by a second apparatus. In one such embodiment where the apparatus is a dongle, the MMI 126 is provided for by a computer such as a laptop that the dongle is to be connected to. Such an MMI may include a touch pad, a display, a keypad, audio in and output and/or a touch display as are known (not shown). In one embodiment the mobile station further comprises an antenna 130 and a second memory 140 that comprises user applications such as a message handling application, a voice call handling application, a text editor, an internet browser application and drivers for further devices to be connected to or incorporated in the apparatus, such as a camera module for example. In one embodiment memories 110 and 140 are incorporated within the same memory module.

Figure 1C:
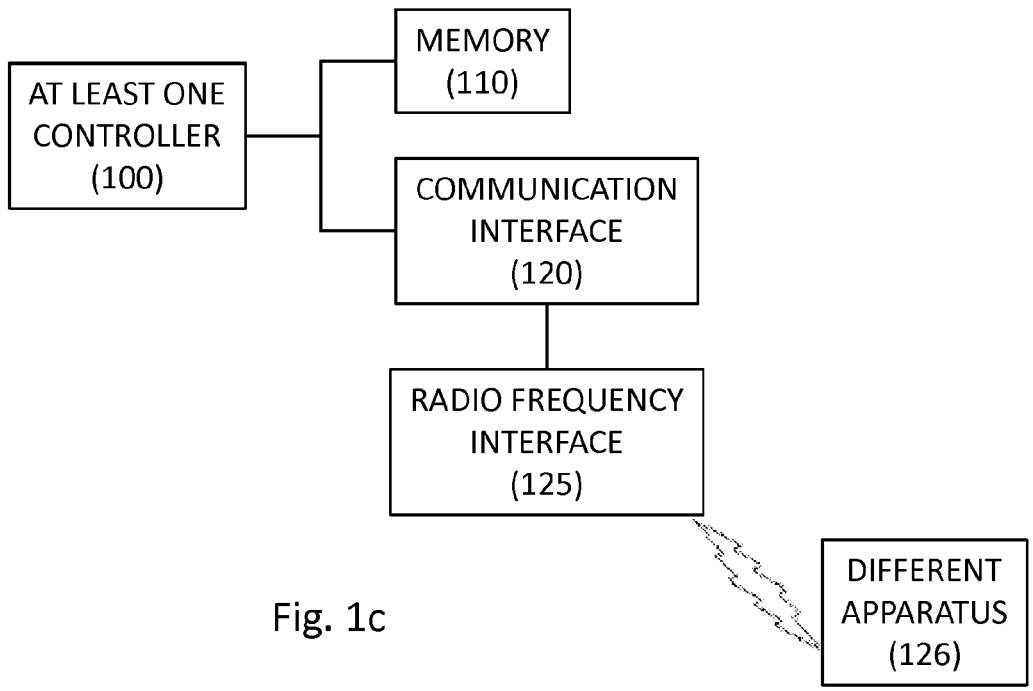
FIG. 1c is a block diagram illustrating an apparatus according to embodiments discussed herein.

FIG. 1c is a block diagram illustrating an apparatus according to an embodiment. In one embodiment the apparatus is a base station or NodeB. The apparatus comprises at least one controller 100, such as a processor, a memory 110 and a communication interface 120. In the memory 110 computer instructions are stored which are adapted to be executed on the processor 100. The communication interface 120 is adapted to receive and send information to and from the processor 100. The communication interface 120 further comprises a radio frequency interface 125 for communicating between different apparatuses 150 such as between a base station and a UE or between two base stations or between a base station and an upper level of a communications system network (NW).

In one embodiment the apparatus is, for example, a mobile node, NodeB, user equipment, cellular phone, and a mobile terminal, an Application Specific Integrated Circuit (ASIC), an Integrated Chip (IC) or any chip. FIG. 1a is an example embodiment of an ASIC. FIG. 1b is an example embodiment of a mobile phone.

In one embodiment an apparatus according to above is adapted to be part of a radio network. The network may be a GSM-Edge Radio Access Network (GERAN). The network may also be any cellular radio access network such as, for example, an E-UTRAN or a UMTS Terrestrial Radio Access Network (UTRAN). Such a system comprises a number of base stations each handling a cell. At least one User Equipment, UE, is part of a cell and being handled by the cell's base station. A UE may be mobile and is thus able to move between cells.

FIG. 2 shows a series of flow charts each according to an embodiment of the teachings herein.

Figure 2A:
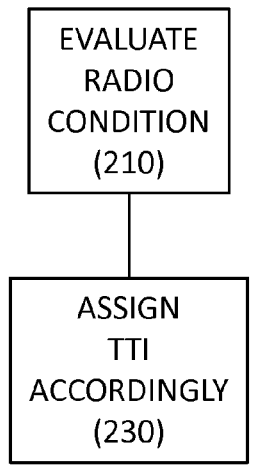
FIG. 2a is a flowchart illustrating a method according to embodiments discussed herein.
Figure 2B:
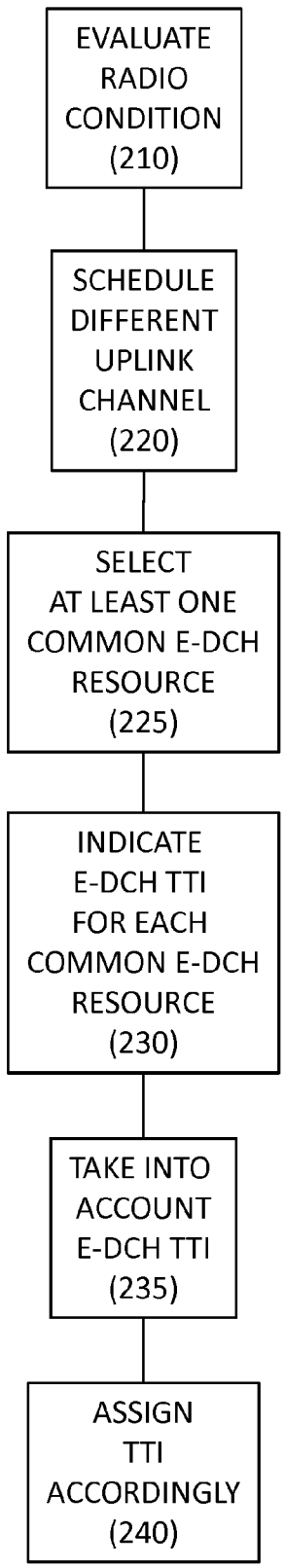
FIG. 2b is a flowchart illustrating a method according to embodiments discussed herein.
Figure 2C:
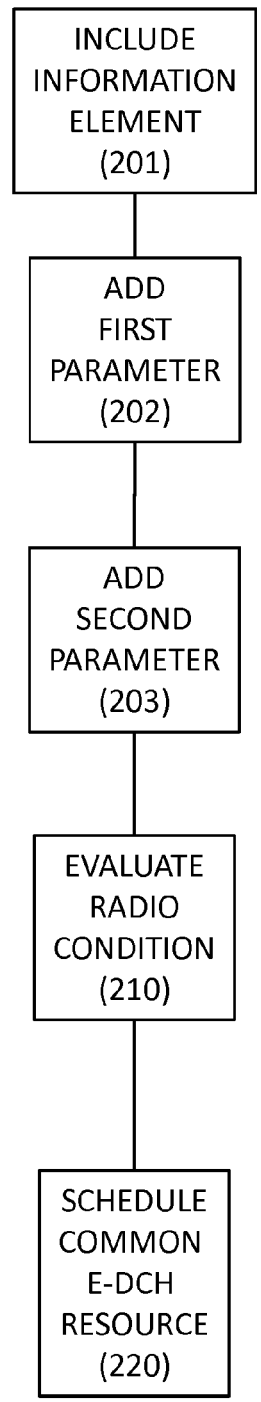
FIG. 2c is a flowchart illustrating a method according to embodiments discussed herein.

In one embodiment, FIG. 2a, a controller is configured to dynamically change the TTI for a UE in a cell. The TTI is an example of a timing parameter. In one embodiment the controller is configured to evaluate (210) a radio condition for a UE and to assign a TTI accordingly (230).

In one embodiment the controller is also configured to evaluate a change in the radio condition as part of the evaluation of the radio condition.

In one embodiment the controller is comprised in a base station such as a NodeB.

In one embodiment the controller is configured to evaluate a radio condition for a UE by evaluating the UE Power Headroom (UPH) which is reported in a UMTS system in the Scheduling Information (SI) or through a Channel Quality Indicator (CQI) being sent over an HS-DPCCH (Dedicated Physical Control CHannel for High-Speed Downlink Shared CHannel HS DSCH).

In one embodiment the radio condition is dependent on external disturbances such as obstructions and/or noise sources.

In one embodiment the radio condition is dependent on the position of the UE in the cell and a controller is configured to detect that a UE in a cell is either at a position close to the cell center or at a position near an edge of the cell and in correspondence thereto assign a TTI accordingly (230). A TTI having a short delay time (for example 2 ms) is assigned to a UE that is near the centre and a TTI having a longer delay time (for example 10 ms) is assigned to a UE that is near to an edge of the cell.

Thus the benefits (shorter latency) of the shorter TTI are used for the UEs that can benefit of the shorter TTI and the longer TTI is used for the UEs needing a longer range. And for both cases power is conserved as there is no need for automatic unnecessary repeated transmissions.

In one embodiment the (see FIG. 2b) controller is configured to schedule a different uplink channel for each UE (220). The common E-DCH resource is an example of such an uplink channel. In one such embodiment the controller of a NodeB or base station is configured to select at least one common E-DCH resource from a selection of E-DCH resources available in the NodeB (225) and to indicate an E-DCH TTI for each common E-DCH resource (230). The controller is also configured to allocate the at least one common E-DCH resource to a UE in the cell (240) taking into account the E-DCH TTI that is indicated for that common E-DCH resource (235).

In one embodiment the controller is configured to include the uplink channel information in the SIB5 or SIB5bis and send this information to a UE. The UE is then able to use this information to send data on the correct uplink channel to the base station according to the information contained in the SIB5 or SIB5bis.

In one embodiment a controller (see FIG. 2c) is configured to include (201) an information element (IE) in the IE "Common E-DCH system info" included in the System Information Block Type 5 (SIB5) and/or SIB5bis. In one embodiment the IE to be included is "E-AGCH" indicating which Absolute Grant Channel that is to be used. This IE is added to the Radio Resource Control signaling protocol.

In one such an embodiment a controller is now able to configure one additional AGCH for an Enhanced Uplink in a CELL_FACH state.

In one such an embodiment a controller is now able to configure one additional AGCH for an Enhanced Uplink in idle mode operation.

In one such an embodiment a controller is now able to configure one additional AGCH for an Enhanced Uplink in CELL_FACH state and idle mode operation.

In one embodiment a controller is also configured to add a first parameter (202) namely an AGCH selector index indicating which AGCH to be used for a corresponding common E-DCH resource.

In one embodiment a controller is also configured to add a second parameter (203) namely an E-DCH TTI for each entry in the corresponding E-DCH resource configuration list.

In one such embodiment the first and/or second parameters are part of a Radio Resource Control signaling protocol In such an embodiment a NW is able to set up one E-DCH resource for each UE.

In one embodiment (see FIG. 2d) a controller is configured to assign an E-DCH TTI entry for each common E-DCH configuration entry. (232) In one example having 32 entries a TTI of 2 ms is assigned to 16 entries and a TTI of 10 ms is assigned to the other 16 entries. In one embodiment the assignment of E-DCH TTIs to the common E-DCH configuration entries are done as part of the step 230.

In one embodiment (see FIG. 2e) a controller is configured to receive a request for an allocation of common E-DCH resource (233) and in response thereto allocate a common E-DCH resource (234) taking into account the radio condition and the suitability of the TTI for the radio condition.

Figures 2D, 2E:
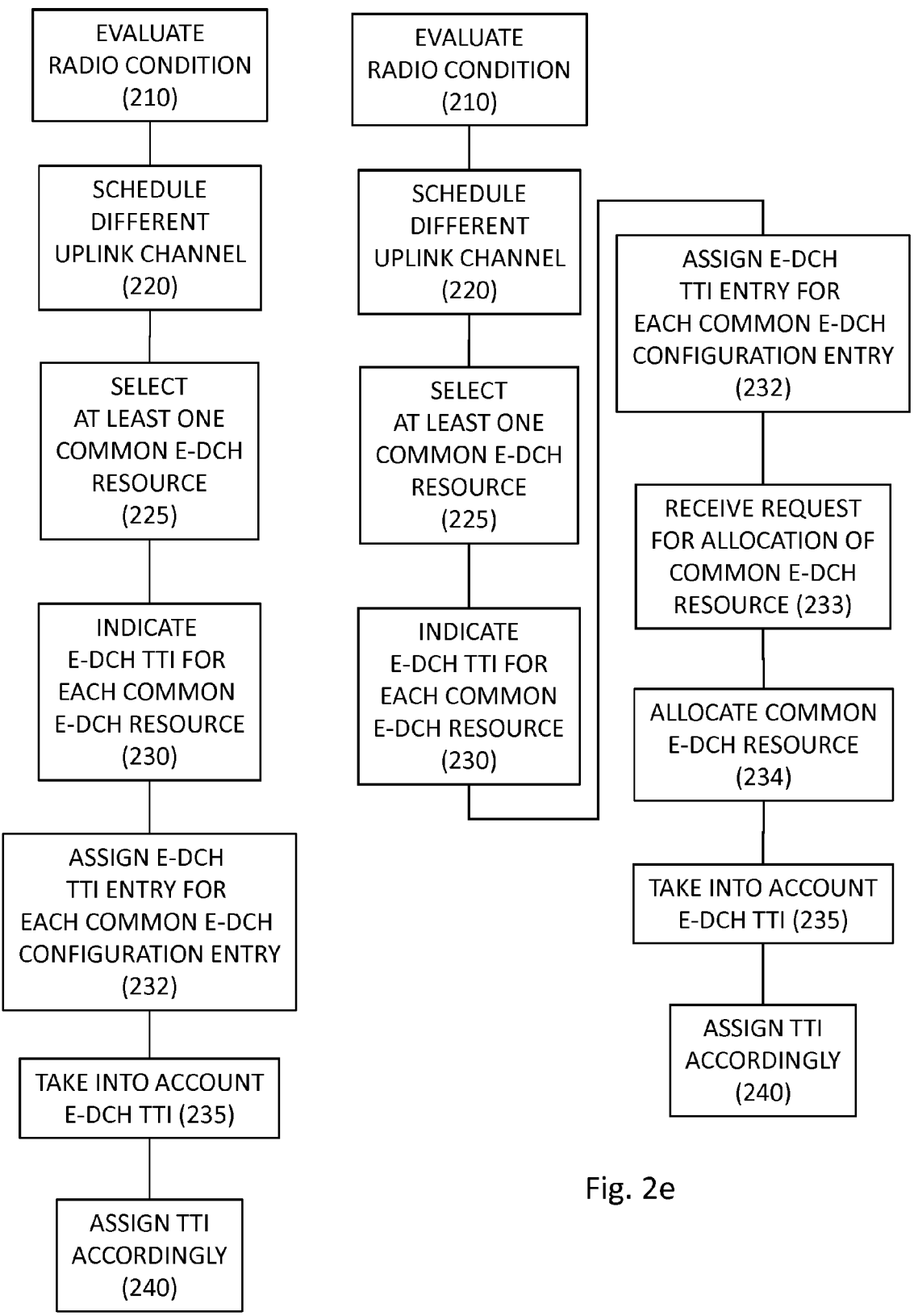
FIG. 2d is a flowchart illustrating a method according to embodiments discussed herein.
FIG. 2e is a flowchart illustrating a method according to embodiments discussed herein.
Figure 2F:
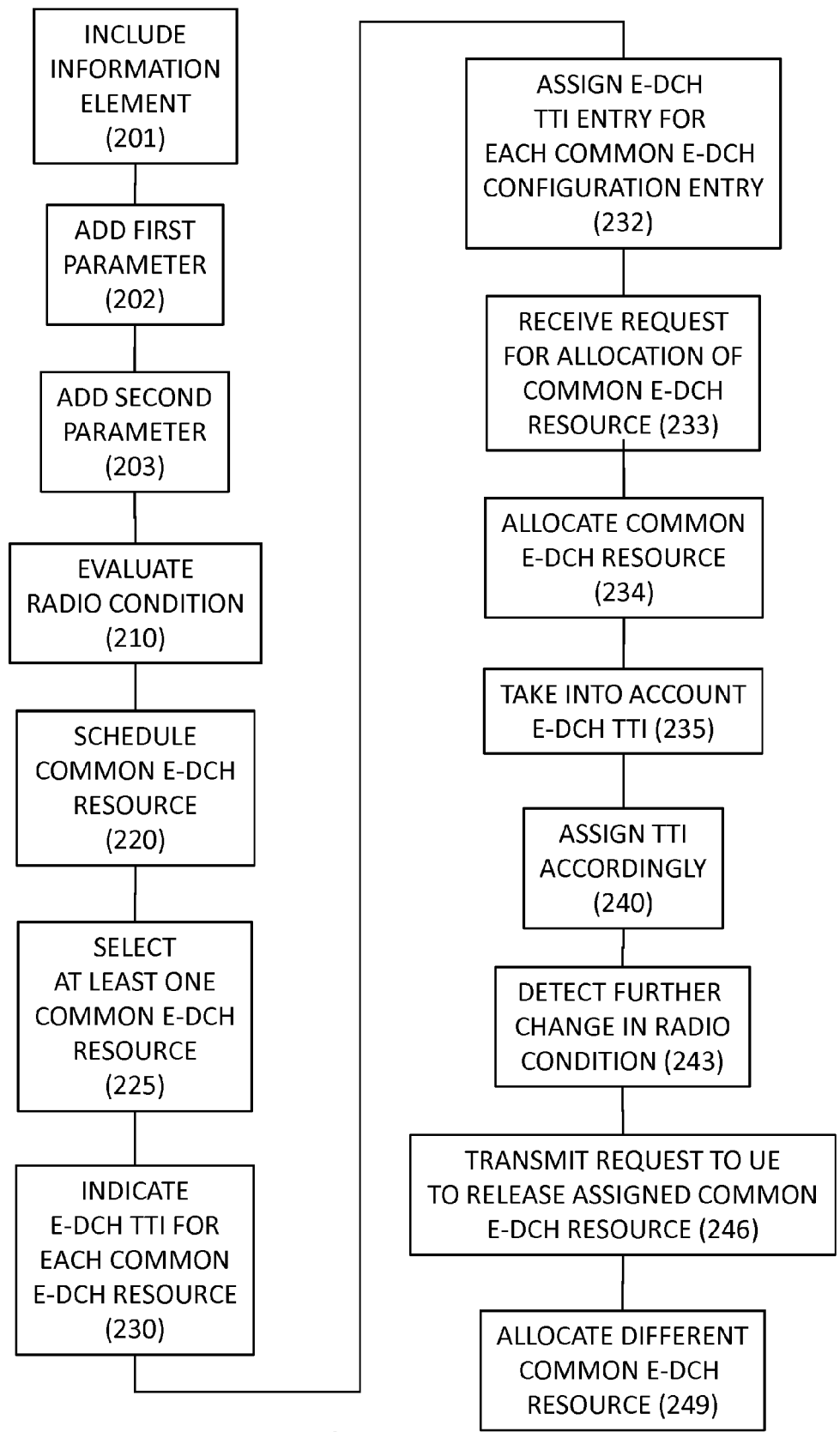
FIG. 2f is a flowchart illustrating a method according to embodiments discussed herein.

In one embodiment the controller of FIG. 2e is a base station in an UTRAN network.

In such embodiments a network can dynamically change the E-DCH TTI without modifying the Broadcast Control Channel, BCCH, an operation which may take several seconds, and thereby decrease the latency and increase the efficiency of a network and the E-DCH TTI can be optimized based on a radio condition.

In one embodiment (see FIG. 2f) a controller is configured to detect a further change in a radio condition (243) and transmit a request to a UE to release an assigned common E-DCH resource (246) and thereafter allocate a different common E-DCH resource (249). It should be noted that the detection of a changed radio condition referenced here by 243 is in some embodiments the same operation as the evaluation of the radio condition referenced by 210 and the transmittal of a request to release (246) is then transmitted before the scheduling of a common E-DCH resource (220) and the allocation of a different common E-DCH resource (249) is the same operation as 220 see FIG. 2fbis).

Through the teachings of this application a network can thus be arranged to change the timing parameters dynamically for an uplink channel and in particular for a UMTS system the network can provide E-DCH TTI information per common E-DCH resource. The network can also provide E-DCH AGCH information per common E-DCH resource and thereby change the E-DCH TTI by reallocating a common E-DCH resource with an E-DCH TTI suitable for a UE.

It should be noted that a network employing the teachings above is able to allocate one E-DCH resource to a first apparatus, being a wireless terminal in one embodiment, using a first AGCH with a timing parameter of 2 ms and to allocate a second E-DCH resource to a second apparatus, being a wireless terminal in one embodiment, using a second AGCH with a timing parameter of 10 ms. Such a network is also able to switch the allocation of resources for a terminal and also to switch the AGCH for a terminal and also to switch the timing parameter. The network is thus able to optimize the performance of wireless terminals allowing the ones with a good radio condition to use a fast timing parameter of 2 ms and the terminals with a bad radio condition to use a timing parameter of 10 ms ensuring a better reception.

The embodiments described hereinbefore in association with FIGS. 1 and 2 may be used in any combination with each other. Several of the embodiments may be combined together to form a further embodiment.

The exemplary embodiments can be included within any suitable device, for example, including any suitable servers, workstations, PCs, laptop computers, PDAs, Internet appliances, handheld devices, cellular telephones, wireless devices, USB dongle, data card, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, UTRAN and E-UTRAN Networks, Public Switched Telephone Network (PSTNs), Packet Data Networks (PDNs), the Internet, intranets, a combination thereof, and the like.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Node B, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth™ module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices, or one or more software entities such as modules.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The embodiments described hereinbefore in association with FIGS. 1 and 2 may be used in any combination with each other. Several of the embodiments may be combined together to form a further embodiments.

It is obvious to a person skilled in the art that with the advancement of technology, the basic idea may be implemented in various ways. The invention and its embodiments are thus not limited to the examples described above; instead they may vary within the scope of the claims.

The invention claimed is:

1. A network apparatus for a wireless network, the network apparatus being configured to communicate with wireless mobile terminals and to control communication of the wireless mobile terminals, and the network apparatus comprising at least one controller configured with a memory storing computer instructions to schedule a given wireless mobile terminal in a cell for a first common Enhanced Dedicated Channel (E-DCH) resource selected from a selection of common E-DCH resources available in the cell by:
   including an information element in a System Information Block (SIB) that is SIB5 or SIB5bis, wherein the information element indicates what Absolute Grant Channel (AGCH) configuration parameters are to be used, the AGCH configuration parameters including for each AGCH a 2 ms transmission time interval (TTI) or a 10 ms TTI, and the information element further indicates the respective TTI and AGCH to be used for each of the selection of common E-DCH resources, wherein some of the common E-DCH resources have an AGCH with the 2 ms TTI, and others of the common E-DCH resources have an AGCH with the 10 ms TTI; and
   without modifying the information element, selecting for and allocating to the given wireless terminal in the cell the first common E-DCH resource taking into account the respective TTI indicated for the first common E-DCH resource.

2. The network apparatus according to claim 1, the controller with the memory storing computer instructions being further configured to dynamically change between the 2 ms TTI and the 10 ms TTI for the given wireless mobile terminal by detecting and evaluating a change in a radio condition for the given wireless mobile terminal and scheduling and allocating a different second common E-DCH resource for the given wireless mobile terminal.

3. The network apparatus according to claim 1, wherein the AGCH for each of the selection of common E-DCH resources is indicated by an AGCH selector index.

4. The network apparatus according to claim 1, the controller with the memory storing computer instructions is further configured to receive a request for an allocation of a common E-DCH resource from the given wireless mobile terminal and in response thereto to detect and evaluate a radio condition for the given wireless mobile terminal and thereafter to allocate the first common E-DCH resource and corresponding AGCH taking into account the radio condition and suitability of the respective TTI indicated for the first common E-DCH resource for the radio condition.

5. The network apparatus according to claim 4, the controller with the memory storing computer instructions is further configured to detect and evaluate a change in the radio condition and to transmit a request to the given wireless mobile terminal to release the first common E-DCH resource and AGCH, and thereafter allocate to the given wireless mobile terminal a different second E-DCH resource and corresponding AGCH for which a different TTI is indicated.

6. The network apparatus according to claim 1, wherein the apparatus is a base station.

7. The network apparatus according to claim 1, wherein the apparatus is a network chipset.

8. The network apparatus according to claim 1, wherein the TTI indicated for use with the first common E-DCH resource allocated to the given wireless mobile terminal is 10 ms, and the controller with the memory storing computer instructions is configured to allocate to a different second wireless terminal, without modifying the information element, a second common E-DCH resource for which the TTI indicated for use is 2 ms.

9. A method for a network apparatus of a wireless network, the network apparatus being configured to communicate with wireless mobile terminals and to control communication of the wireless mobile terminals, the method comprising scheduling a given wireless mobile terminal in a cell for a first common Enhanced Dedicated Channel (E-DCH) resource selected from a selection of common EDCH resources available in the cell by:
   including an information element in a System Information Block (SIB) that is SIB5 or SIB5bis, wherein the information element indicates what Absolute Grant Channel (AGCH) configuration parameters are to be used, the AGCH configuration parameters including for each AGCH a 2 ms transmission time interval (TTI) or a 10 ms TTI, and the information element further indicates the respective TTI and AGCH to be used for each of the selection of common E-DCH resources, wherein some of the common E-DCH resources have an AGCH with the 2 ms TTI, and others of the common E-DCH resources have an AGCH with the 10 ms TTI; and
   without modifying the information element, selecting for and allocating to the given wireless mobile terminal in the cell the first common E-DCH resource taking into account the respective TTI indicated for the first common E-DCH resource.

10. The method according to claim 9, wherein the TTI indicated for use with the first common E-DCH resource is 10 ms, and the method further comprises allocating to a different second wireless terminal, without modifying the information element, a second common E-DCH resource for which the TTI indicated for use is 2 ms.

11. A non-transitory computer readable memory storing a computer program for a network apparatus of a wireless network, the network apparatus being configured to communicate with wireless mobile terminals and to control communication of the wireless mobile terminals, and the computer program comprising code which when executed on a data-processing system controls the network apparatus to schedule a given wireless mobile terminal in a cell for a first common Enhanced Dedicated Channel (E-DCH) resource selected from a selection of common E-DCH resources available in the cell by:

including an information element in a System Information Block (SIB) that is SIB5 or SIB5bis, wherein the information element indicates what Absolute Grant Channel (AGCH) configuration parameters are to be used, the AGCH configuration parameters including for each AGCH a 2 ms transmission time interval (TTI) or a 10 ms TTI, and the information element further indicating the respective TTI and AGCH to be used for each of the selection of common E-DCH resources, wherein some of the common E-DCH resources have an AGCH with the 2 ms TTI, and others of the common E-DCH resources have an AGCH with the 10 ms TTI; and without modifying the information element, selecting for and allocating to the given wireless mobile terminal in the cell at least the first common E-DCH resource taking into account the respective TTI indicated for the first common E-DCH resource.

12. The non-transitory computer readable memory storing the computer program according to claim 11, wherein the TTI indicated for use with the first common E-DCH resource is 10 ms and the code, when executed on a data-processing system, further controls the network apparatus to allocate to a different second wireless terminal, without modifying the information element, a second common E-DCH resource for which the TTI indicated for use is 2 ms.

13. The non-transitory computer readable memory storing the computer program according to claim 11, wherein said computer readable memory is a local memory of the network apparatus.

14. The apparatus according to claim 1, wherein each respective TTI is indicated by an E-DCH TTI parameter which is provided for each entry in a corresponding common E-DCH resource configuration list of the information element.

15. A wireless mobile terminal, comprising at least one controller configured with a memory storing computer instructions, configured to use an allocated first and second common Enhanced Dedicated Channel (E-DCH) resource from a selection of common E-DCH resources available in a cell to determine a transmission time interval (TTI) and an associated Absolute Grant Channel (AGCH) of the respectively allocated common E-DCH resource by:

using an information element in a received System Information Block (SIB) that is SIB5 or SIB5bis, wherein the information element indicates what AGCH configuration parameters are to be used, the AGCH configuration parameters including for each AGCH a 2 ms TTI or a 10 ms TTI;

using the respectively indicated TTI and AGCH for the allocated first common E-DCH resource, wherein at least the first common E-DCH resource has an AGCH with the 2 ms TTI, and at least the second common E-DCH resource has an AGCH with the 10 ms TTI; and thereafter while the information element remains unmodified, dynamically changing the TTI in use by the wireless mobile terminal between the 2 ms TTI and the 10 ms TTI by signaling received from the network which allocates the second common E-DCH resource.

\* \* \* \* \*